(12) United States Patent
Tuccinardi et al.

(10) Patent No.: US 6,522,368 B1
(45) Date of Patent: Feb. 18, 2003

(54) PORTABLE VEHICLE VIDEO SYSTEM

(75) Inventors: Eugene M. Tuccinardi, Temecula, CA (US); John M. Dunkle, Temple City, CA (US); Gordon H. Buck, Torrance, CA (US); Ernesto R. Haack, Prescott, AZ (US)

(73) Assignee: Timely Innovations, LP, Temecula, CA (US)

( * ) Notice: Subject to any disclaimer, the term of this patent is extended or adjusted under 35 U.S.C. 154(b) by 0 days.

(21) Appl. No.: 09/574,602

(22) Filed: May 19, 2000

(51) Int. Cl.$^7$ ................................................. H04H 5/64
(52) U.S. Cl. ........................ 348/837; 348/838; 248/923
(58) Field of Search ........................... 312/7.2; 348/836, 348/837, 838; 248/917, 918, 919, 922, 923; 296/35.3

(56) References Cited

U.S. PATENT DOCUMENTS

| | | | | |
|---|---|---|---|---|
| 4,525,746 A | * | 6/1985 | Mangold et al. | ............ 358/254 |
| 4,635,110 A | * | 1/1987 | Weinblatt | .................... 348/837 |
| 4,843,477 A | * | 6/1989 | Mizutani et al. | ............ 348/837 |
| 5,946,055 A | | 8/1999 | Rosen | |
| 6,216,927 B1 | * | 4/2001 | Meritt | ........................ 348/837 |

OTHER PUBLICATIONS

Product News, Mobil Electronics, Sep. 1999.
Mobile Video, Audiovox, downloaded Dec. 23, 1999.
Photograph—Integrated Video Concepts, undated.
Brochure: Mobile Video, Roof Mount Flipdown Pod, Audiovox 1998.
Brochure: Mobile Video, Audiovox 1999.
Brochure: in VUE II, Rosen Unlimited Vision.
Brochure: Mobile Video, EZ Fit Console, Audiovox 1998.
Brochure: Accelevision, Mobile Entertainment Systems.
Brochure: Mobile TV.
Brochure: DVD Video, Panasonic.
Brochure: Mobile Video Entertainment, Santeca, 1998.
Brochure: Electronics and More, Parts Express, 1999.
Brochure: Video & TV Traveler.
Brochure: Mobile Movie Theater, skymall.
Brochure: Making Driving Fun, Texas Saddlebags, Inc.

* cited by examiner

*Primary Examiner*—Lanna Mai
*Assistant Examiner*—Jerry Anderson
(74) *Attorney, Agent, or Firm*—Snell & Wilmer, LLP

(57) ABSTRACT

The present invention relates generally to a portable vehicle video system. The preferred portable vehicle video system comprises a flat panel video display that can pivot flat against the vehicle ceiling when not in use. The preferred video display contains a digital video disk (DVD) player, a wireless transmitter, a wireless receiver and at least one pair of speakers. The video display is mounted to a vehicle's headliner by a vehicle mount comprising a block containing a pivot port; said block mounted to an anchor by a nut. A remote transmitter is connected to an audio/video source such as a console video game system or a video cassette recorder (VCR). The preferred system has at least one pair of wireless headphones to receive an audio signal from the display. The preferred system also has a portable stand comprising a base, a battery and a pivot port for holding the video display when not mounted to the ceiling of the vehicle. The present invention has a simple method of installation, stows easily when not in use, is wireless, and easily portable.

15 Claims, 5 Drawing Sheets

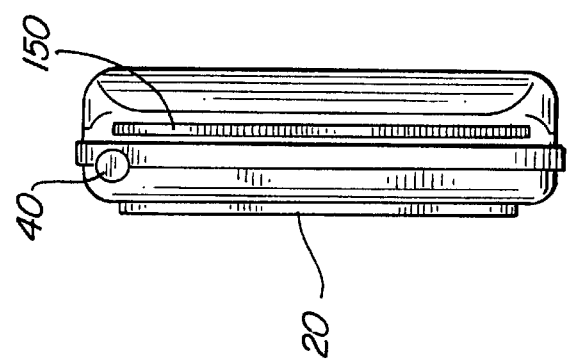
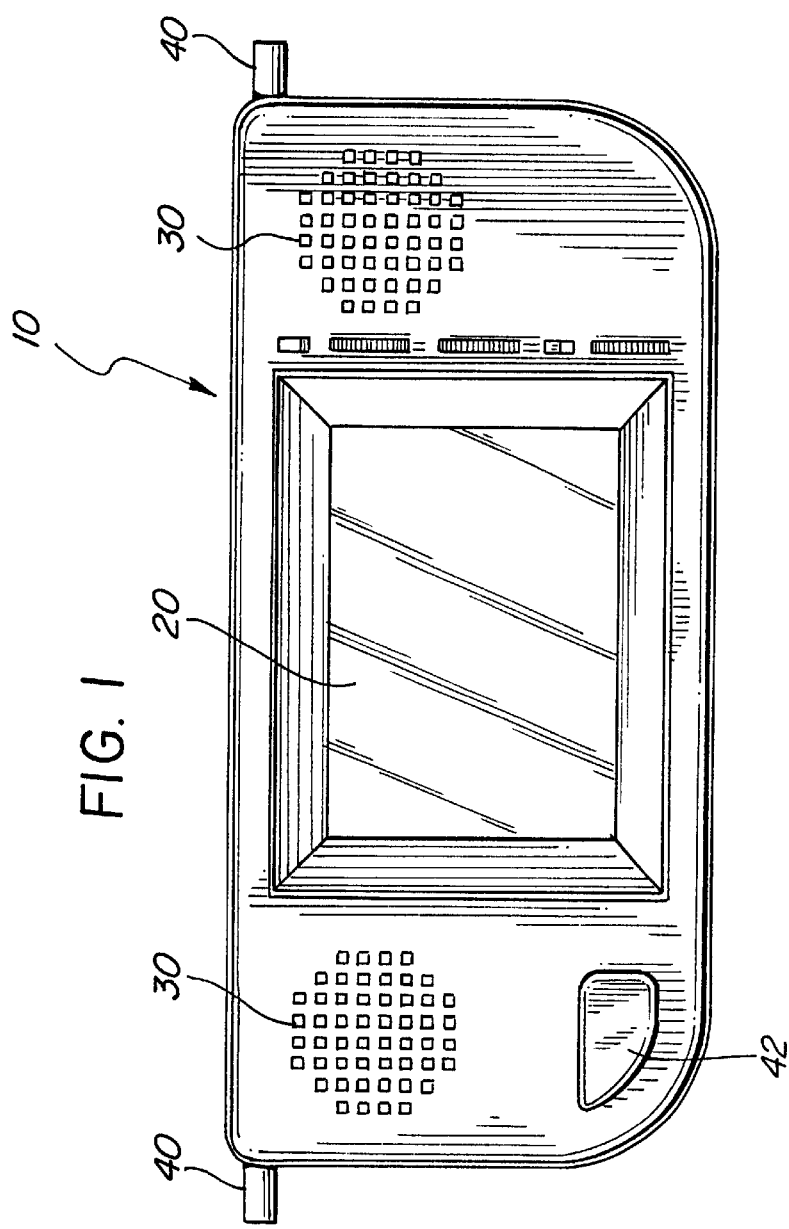

PORTABLE VEHICLE VIDEO SYSTEM

BACKGROUND OF THE INVENTION

1. Technical Field

The present invention relates generally to a vehicle video system and more particularly a vehicle video system that is portably mounted in the vehicle.

2. Background Art

The prior art comprises several vehicle video systems for installation into a vehicle such as a car, minivan, van, or motor home. For example, one video system comprises a video monitor hooked by cables to audio/video sources such as VCRs or console video game systems and that is contained in a large luggage-like bag strapped to the driver and front passenger seats. Other systems are affixed to bases between the driver and front passenger seats. Other systems are attached to the headrests of the driver's seat or front passenger seat.

Frequently, the prior art vehicle video systems may not be easily portable or may rely only on the vehicle for its power source. The prior art systems can be cumbersome, often require professional installation, may be poorly placed in the vehicle or may not be easily stowed. A portable, easily stowed, vehicle video system with a simple method of installation is needed.

SUMMARY OF THE INVENTION

The present invention relates generally to a portable vehicle video system. The preferred portable vehicle video system comprises a flat panel video display that can pivot flat against the vehicle ceiling when not in use. The preferred video display contains a digital video disk (DVD) player, a wireless transmitter, a wireless receiver and at least one pair of speakers. The video display is mounted to a vehicle's headliner by a vehicle mount comprising a block containing a pivot port; said block mounted to an anchor by a nut. A remote transmitter is connected to an audio/video source such as a console video game system or a video cassette recorder (VCR). The preferred system has at least one pair of wireless headphones to receive an audio signal from the display. The preferred system also has a portable stand comprising a base, a battery and a pivot port for holding the video display when not mounted to the ceiling of the vehicle. The present invention has a simple method of installation, stows easily when not in use, is wireless, and easily portable.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with accompanying drawings.

FIG. 1 is a front view of a preferred embodiment of the video display.

FIG. 2 is a side view of a preferred embodiment of the video display.

DETAILED DESCRIPTION OF THE PREFERRED EMBODIMENTS

Figure 3:
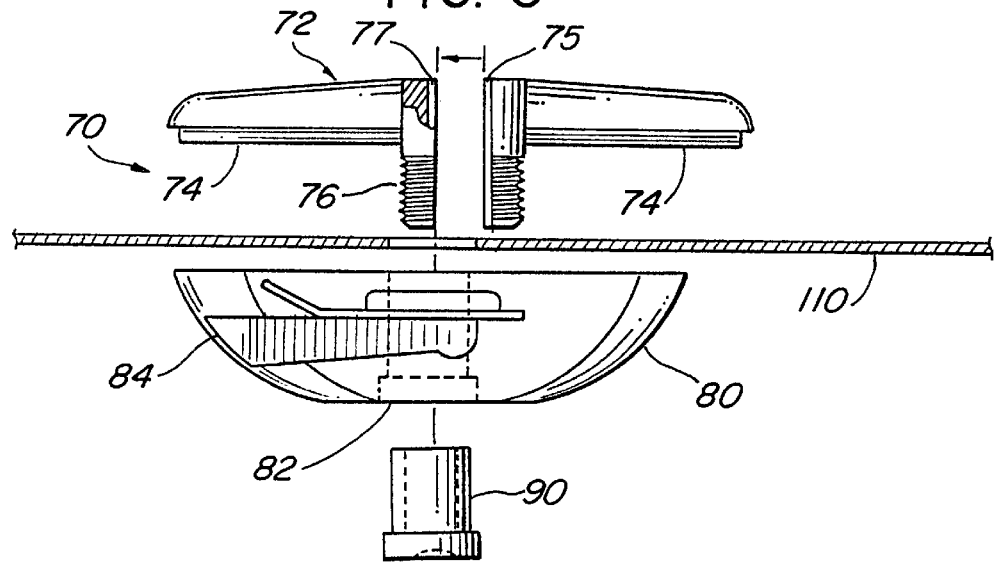
FIG. 3 is an exploded view of a preferred embodiment of the vehicle mount.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a portable vehicle video system.

Referring now to FIG. 1, a preferred embodiment of a video display 10 is shown. The video display 10 comprises a screen 20, a pair of speakers 30, and two pivots 40. The preferred embodiment of the pivots 40 comprises a conductor to transmit power to the rest of the video display 10. The video display 10 further comprises a DVD player 150, a wireless receiver, preferably a multi-channel receiver, for reception of multiple audio/video source signals. The preferred video display also comprises a wireless transmitter for transmission of an audio signal to wireless headphones 100. The wireless transmitter is preferably an infrared transmitter 42.

The preferred embodiment of the video display 10 runs on a 12 volt DC power source. The preferred power source when the video display 10 is mounted in a vehicle is from the vehicle's domelight or map light. The preferred embodiment of the video display 10 is a flat panel liquid crystal display (LCD) with controls for power, source, color, brightness and volume. A Unipack 6.8 LCD panel display is preferred.

FIG. 2 shows a side view of the preferred video display. A slot for the DVD player 150 is shown. A digital video disc tray can also be used in place of the slot.

FIG. 3 is an exploded view of a preferred vehicle mount 70. The vehicle mount comprising an anchor 72 with two support arms 74 and a threaded shaft 76 is inserted into a hole in the vehicle's headliner 110. The preferred embodiment of the anchor 72 is a split "T" shape comprising two sections, in particular a section with a bead 75 and a section with a groove 77. The split "T" shape allows for easier insertion of the anchor 72 into to the hole in the vehicle headliner 110 for installation. The bead 75 and groove 77 allow for easier alignment of the sections during installation of the vehicle mount 70. Each section has a support arm 74 and a portion of the threaded shaft 76.

Figure 10:
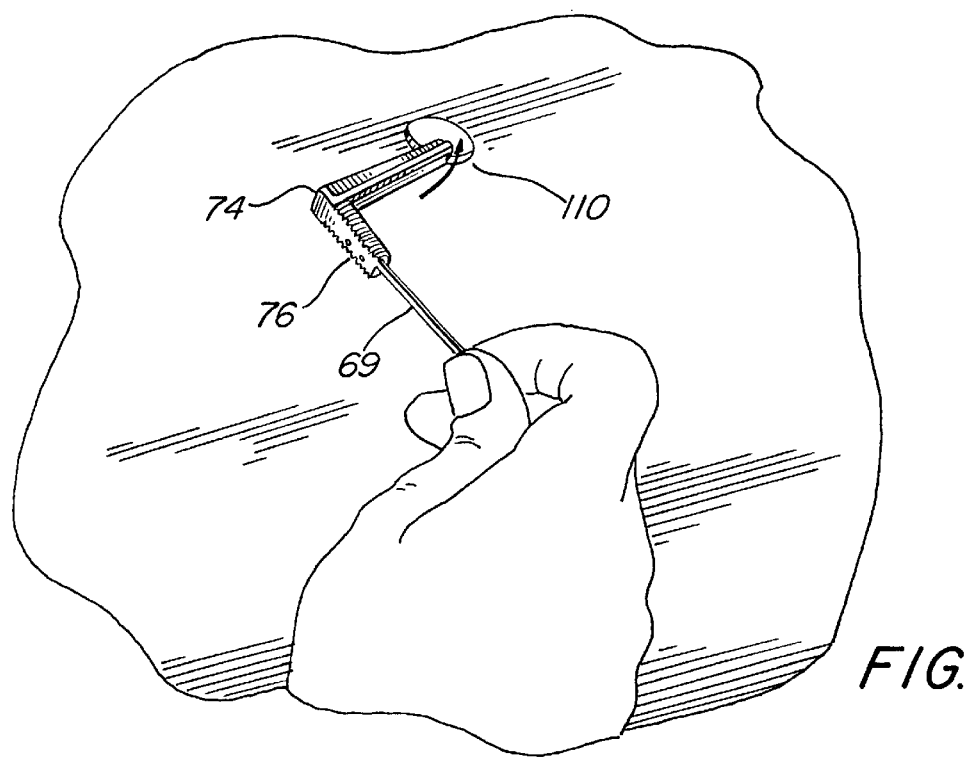
FIG. 10 is a perspective view of a user installing an alternative embodiment of a section of the anchor in a hole in the vehicle's headliner.
Figure 11:
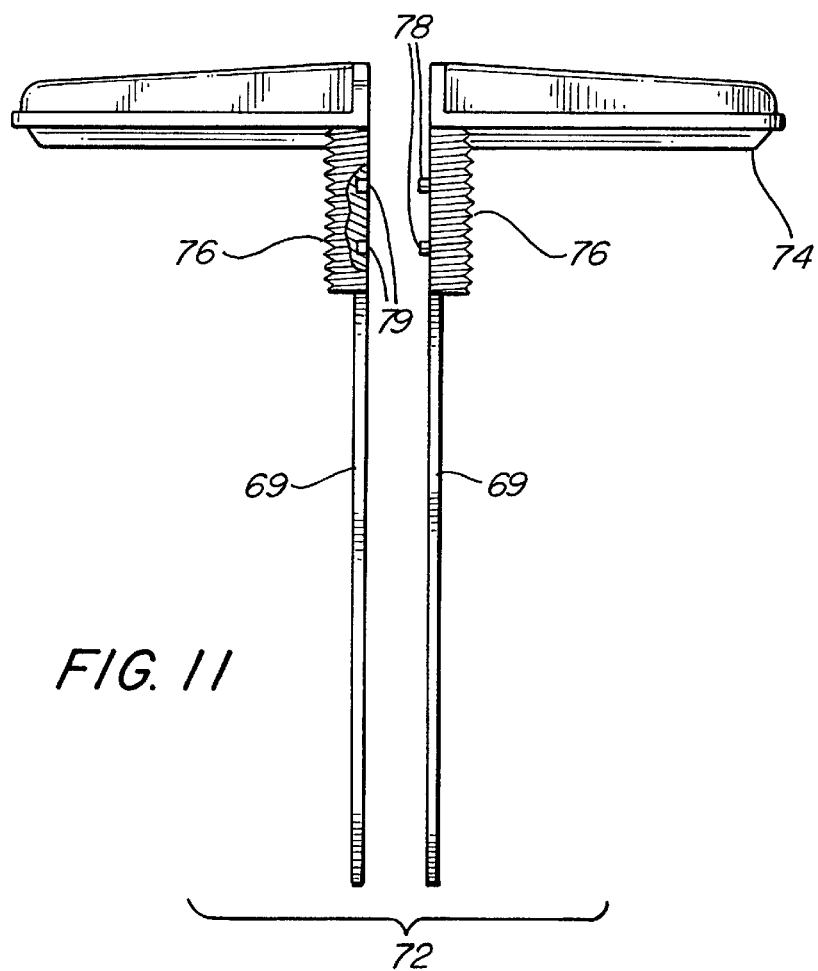
FIG. 11 is a side view of an alternative embodiment of an anchor with aligning legs attached.

An alternative preferred embodiment of the anchor 72 is shown in FIGS. 10 and 11. In FIG. 11, the bead 75 and groove 77 have been replaced with a set of two alignment pegs 78 and two notches 79. The alignment pegs 78 and notches 79 also allow for easier alignment of the sections during installation of the vehicle mount 70.

The embodiment in FIG. 11 also has aligning legs 69. Aligning legs 69 can be used on either the FIG. 11 or the FIG. 3 embodiment of the anchor 72. The aligning legs assist installation of the anchor 72 in a hole in the vehicle headliner 110. As shown in FIG. 10, a person grasps the aligning leg 69 and places the support arm 74 of the anchor 72 in the hole in the headliner 110. The section of the threaded shaft 76 then hangs down from the hole in the headliner 110. The two sections of the anchor 72 are then aligned together using the bead 75 and groove 77 or the alignment pegs 78 and notches 79. The aligning legs 69 are then removed from the anchor 72. Preferably, the aligning legs 69 are thin and can be broken off of the anchor 72.

Figure 4:
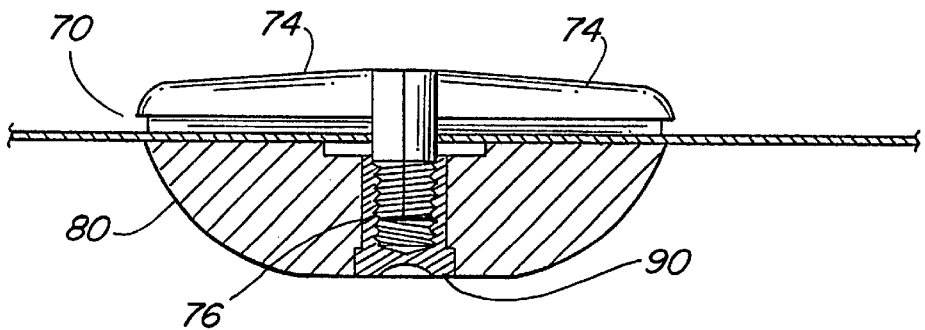
FIG. 4 is a perspective view of a preferred embodiment of the vehicle mount installed.

The threaded shaft 76 hangs down through the hole in the vehicle's headliner 110. A cinch washer can be placed on the threaded shaft 76 to further assist in aligning and holding the two sections of the anchor 72 together during installation. A block 80 comprising an anchor port 82 and a pivot port 84 is placed over the threaded shaft 76 such that the threaded shaft 76 is inserted into the anchor port 82. A nut 90 is then threaded onto the threaded shaft 76 and tightened to affix the block 80 to the threaded shaft 76. The nut 90 is tightened until the block 80 contacts the vehicle's headliner 110. FIG. 4 is a view of the vehicle mount 70 installed.

The pivot port 84 is one of a variety of different attachment means available for attaching the video display 10 to the vehicle mount 70. The attachment means can utilize, inter alia, a hook, a hinge, or a loop to hold the pivot 40 of the video display 10.

Figure 12:
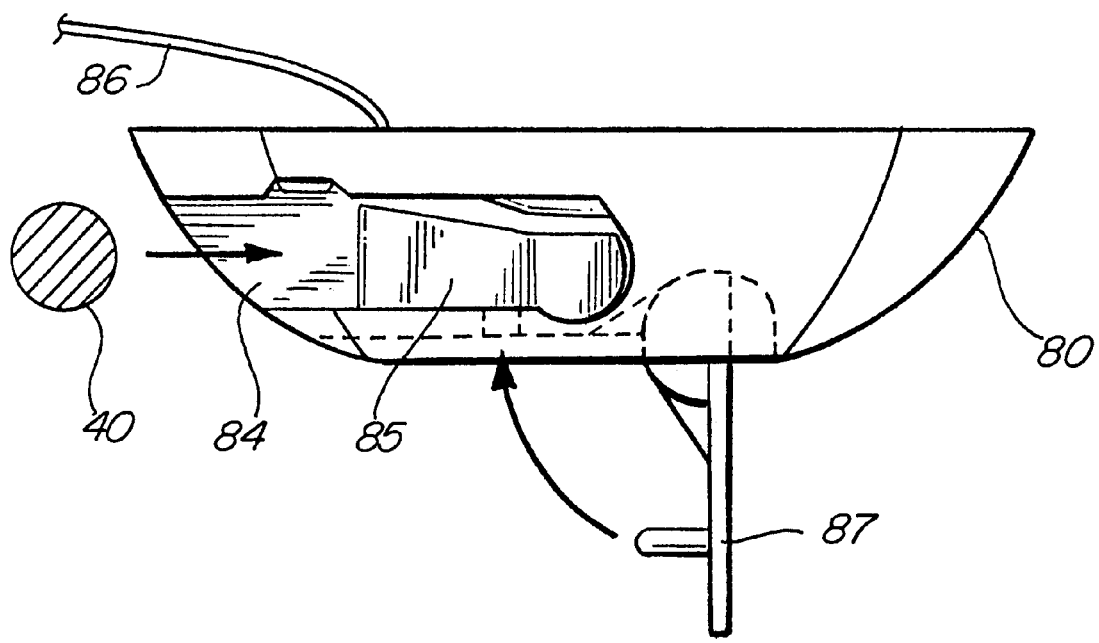
FIG. 12 is a side partial cross-sectional view of an alternative embodiment of the block.
Figure 13:
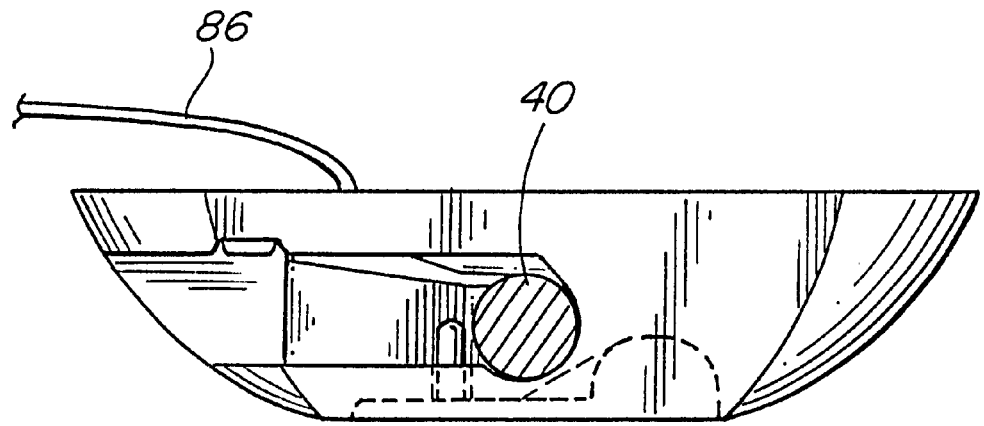
FIG. 13 is a side view of an alternative embodiment of the block with the pivot port lock in the closed position.

FIGS. 12 and 13 show an alternative preferred embodiment of the block 80. The block 80 still comprises an anchor port 82 as shown in FIG. 3 and a pivot port 84. However, the pivot port 84 also comprises a conduction plate 85 connected to a power supply wire 86 to supply power through the pivot 40 to the video display 10. FIG. 12 also shows a pivot port lock 87 in an open position. FIG. 13 shows the pivot port lock 87 in a closed position and holding the pivot 40 in place in the pivot port 84 and against the conduction plate 85.

The vehicle mount 70 lends itself to a simple and useful method of installing a video display 10 in a vehicle. The preferred method of installing the video display 10 comprises the following steps:

First, the installer locates a spot on the vehicle's headliner 110 for mounting the video display 10. Preferably, the spot is along a centerline of the vehicle's headliner 110 and near an existing domelight. The domelight can be used as a power attachment point for the video display 10. Currently, laws exist that prohibit mounting a monitor within a driver's view if it is to be used while the vehicle is in motion. However, this is not a physical limitation of this invention.

In the preferred installation of the video display 10, two vehicle mounts 70 are used. See FIG. 5. The installer marks locations on the headliner 110 for each vehicle mount 70. Generally, for the preferred video display comprising a six inch liquid crystal display, the marks should be fourteen and three-quarter inches (14¾") apart or seven and three-eighths inches (7⅜") from a centerline of the vehicle on both sides.

The installer then cuts a three-quarter inch (¾") hole in the headliner 110 at each mark for the preferred embodiment anchor. Preferably, the installer uses a razor or an Exacto™ knife to cut holes completely through the headliner 110.

For the first vehicle mount, the two sections of the anchor 72 are then placed into one hole such that the threaded shaft 76 extends through the hole. The sections of the anchor 72 are fitted together by the bead 75 and groove 77. If using the embodiment of FIGS. 10 and 11, the alignment pegs 78 are inserted into the notches 79 and the aligning legs 69 are removed. At this point, a cinch washer can be placed on the threaded shaft 76 to further assist in aligning and holding the two sections of the anchor 72 together during installation.

The block 80 containing the anchor port 82 and the pivot port 84 is placed over the threaded shaft 76 such that the threaded shaft 76 extends into the anchor port 82.

The nut 90 is then threaded onto the threaded shaft 76 and tightened such that the block 80 is affixed to the anchor 72 by the nut 90 and the block 80 is in contact with the vehicle headliner 110. A second vehicle mount 70 is then mounted over the remaining hole.

The video display 10 is then attached to each vehicle mount 70 by inserting each pivot 40 into the pivot ports 84 on the first and second blocks 80. Preferably, the pivot port 40 is connected by the conduction plate 85 and power supply wire 86 to the vehicle's domelight or map light for power. However, as described above, the video display 10 can also run on a 12V battery or other 12V DC power source.

Figure 5:
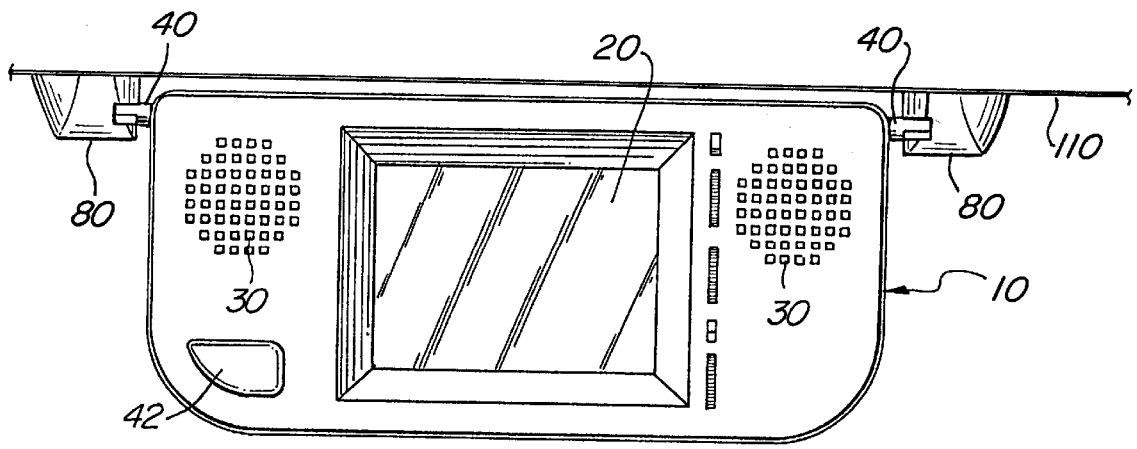
FIG. 5 is a perspective view of a preferred installation.

FIG. 5 is a front view of a preferred installation of the video display 10 installed between two vehicle mounts 70. The pivots 40 on the video display 10 are inserted into the pivot ports 84 on the vehicle mounts 70 and the video display 10 hangs between the mounted pivots 40. See FIGS. 5, 12 and 13. Preferably, the video display 10 faces rearward in the vehicle. When not in use, the video display 10 can be stowed by rotating the video display 10 about the pivots 40 to face the vehicle headliner 110.

An alternative installation is to install one single vehicle mount 70 of sufficient size to hold the video display 10 by a single pivot 40.

Figure 6:
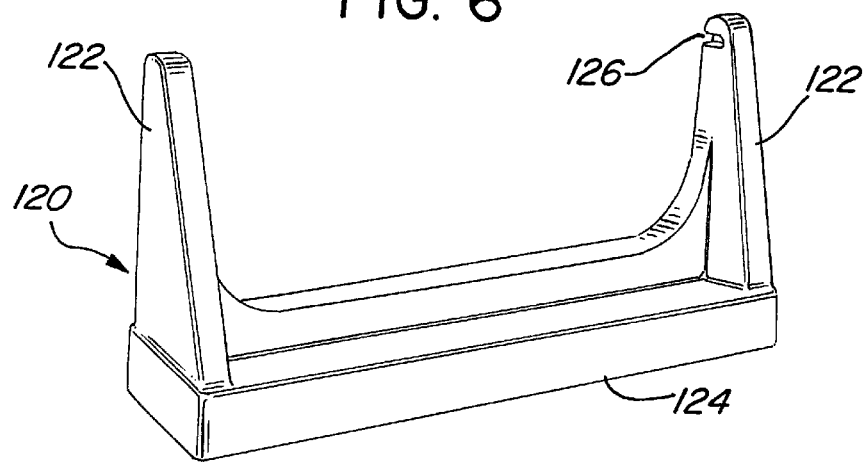
FIG. 6 is a perspective view of a preferred embodiment of the portable stand.

FIG. 6 is a perspective view of a preferred embodiment of a portable stand 120. The preferred portable stand 120 comprises two arms 122 extending from a deck 124. Each arm 122 has a pivot port 126. Each pivot port 126 has a port conductor 128 connected to a power supply, preferably a twelve-volt NiCad rechargeable battery. Alternative embodiments could utilize various 12V-power sources or even have an extension cord with plug for use with a standard power outlet. An alternative embodiment of the portable stand 120 has at least one arm 122 that can fold onto the deck 124.

Figure 7:
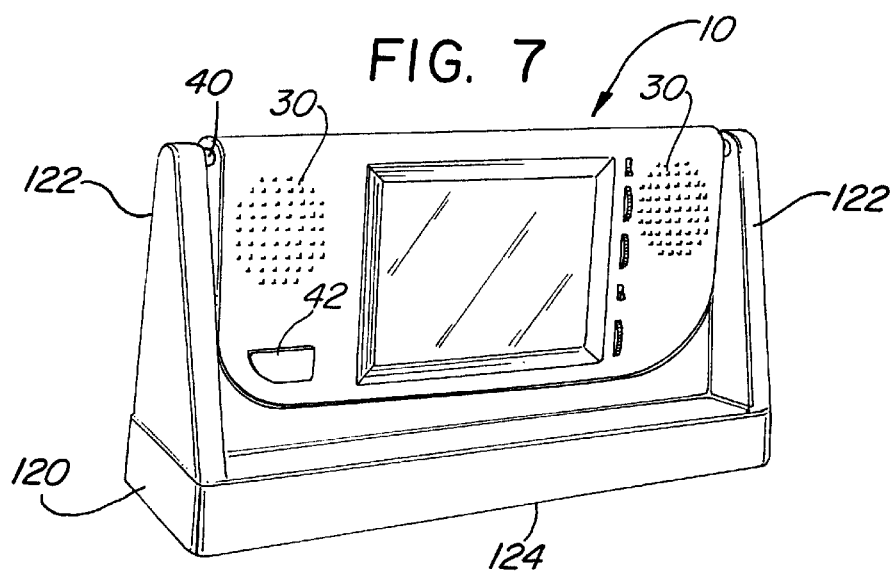
FIG. 7 is a perspective view of a preferred embodiment of the video display mounted on a preferred portable stand.

FIG. 7 is a perspective view of the preferred video display 10 mounted in the portable stand 120. The pivots 40 of the preferred video display 10 are inserted into pivot ports 126 of the portable stand 120. Preferably, the pivots 40 insert into the pivot ports 126 of the portable stand 120 similarly to the pivot ports 84 of the vehicle mounts 70. The pivots 40 contact conduction plates 128 to connect the video display 10 to the portable stand's power supply.

Figure 8:
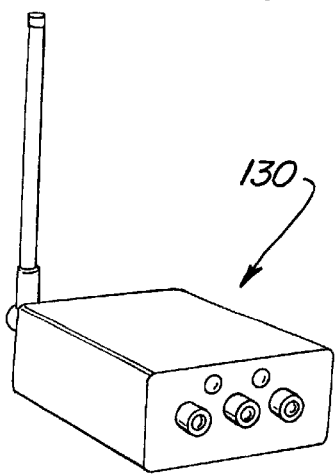
FIG. 8 is a perspective view of a preferred embodiment of a remote transmitter.

FIG. 8 is a perspective view of a preferred remote transmitter 130. The remote transmitter 130 is wireless. The remote transmitter 130 is connectable to a variety of audio/video signal sources such as VCRs, video game consoles and DVD players. The preferred embodiment of the remote transmitter 130 transmits signals between 2400 and 2483 megahertz (MHz) and has a range of approximately sixty feet. Thus, the remote transmitter 130 can transmit to the video display 10 while mounted in the vehicle mount 70 or, if it is in range, in the portable stand 120. Alternative transmission frequencies for the remote transmitter 130 are available as well.

The wireless receiver in the video display 10 receives audio/video signals from the remote transmitter 130. Each remote transmitter 130 is connectable to an audio/video signal source. As stated above, the preferred wireless receiver is a multi-channel receiver. Preferably, the wireless receiver is capable of receiving audio/video signals from at least four different remote transmitters 130. From a source control on the video display 10, the user can switch between different audio/video signal sources connected to remote transmitters 130.

Figure 9:
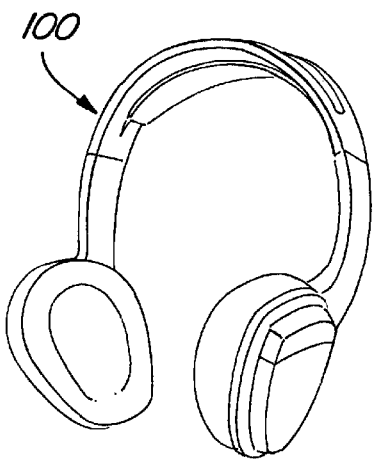
FIG. 9 is a perspective view of a preferred embodiment of a pair of wireless headphone.

FIG. 9 shows the preferred embodiment of a pair of wireless headphones 100. The wireless headphones 100 receive audio signals from the wireless, preferably infrared, transmitter 42 in the video display 10. The use of the wireless headphones 100 permits the user to reduce the likelihood of disturbing other passengers in the vehicle from noise from the portable vehicle video system.

The portable vehicle video system after installation provides flexibility to the user. The user can place the video display 10 in the vehicle mounts 70 for passengers to view and/or use for game-play. The video display 10 can be removed from the vehicle mounts 70 without having to disconnect cables from multiple audio/video sources. Vehicle mounts 70 can also be placed in multiple vehicles so that a single video display 10 can be moved from vehicle to vehicle. The system's portability is also a security benefit because the video display 10 does not have to remain in a vehicle unattended where it could be prone to theft. The video display 10 can be viewed outside the vehicle by using the portable stand 120 in range of one or more remote transmitters 130. This is useful for, inter alia, camping trips and sporting event tailgating.

Therefore, the present invention has several advantages over the prior art. The invention is easy to install and easy to stow when not in use. The video display 10 is also portable and can be moved between different vehicles or moved outside the vehicle and used in the portable stand 120. The system also has several wireless features so numerous connections and cables do not need to be hooked and/or unhooked when moving the video display 10 in and out of a vehicle. This increases portability.

In each of the above embodiments, the different positions and structures of the present invention are described separately in each of the embodiments. However, it is the full intention of the inventor of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A portable vehicle video system comprising a video display comprising a pivot; a vehicle mount comprising a block containing a pivot port; said block mounted to an anchor by a nut; and a portable stand comprising a base, a power source and a pivot port; where the video display is alternately mountable to the vehicle mount and the portable stand.

2. The portable vehicle video system of claim 1 wherein the video display further comprises a wireless receiver.

3. The portable vehicle video system of claim 1 wherein the video display further comprises a digital video disc player.

4. The portable vehicle video system of claim 1 wherein the video display further comprises a wireless transmitter.

5. The portable vehicle video system of claim 1 wherein the video display further comprises an audio output.

6. The portable vehicle video system of claim 1 wherein the power source further comprises a battery.

7. The portable vehicle video system of claim 1 further comprising at least one remote transmitter.

8. The portable vehicle video system of claim 7 where at least one remote transmitter transmits at a frequency of at least 2400 megahertz.

9. A portable vehicle video system comprising a video display comprising a pivot, a wireless transmitter, a wireless receiver and an audio output; the audio output comprising at least one pair of speakers; a vehicle mount comprising a block containing a pivot port; said block mounted to an anchor by a nut; a portable stand comprising a base, a battery and a pivot port; and at least one remote transmitter connectable to an audio/video signal source; where the video display is alternately mountable to the vehicle mount and the portable stand by inserting said pivots into said pivot ports; and where the wireless receiver can receive signals from at least one remote transmitter.

10. The portable vehicle video system of claim 9 wherein the wireless transmitter is an infrared transmitter.

11. The portable vehicle video system of claim 9 further comprising at least one pair of wireless headphones.

12. The portable vehicle video system of claim 9 wherein the video display further comprises a digital video disc player.

13. The portable vehicle video system of claim 9 wherein the wireless receiver has multiple channels and can receive audio/video signals from more than one audio/video signal source.

14. The portable vehicle video system of claim 9 wherein the block comprises an anchor port and a pivot port and the anchor further comprises a plurality of support arms and a threaded shaft connectable to the nut.

15. The portable vehicle video system of claim 9 wherein at least one remote transmitter transmits at a frequency of at least 2400 megahertz.

* * * * *